United States Patent
Misiag

(10) Patent No.: US 8,463,247 B2
(45) Date of Patent: Jun. 11, 2013

(54) LOCATION-BASED DYNAMIC HYPERLINKING METHODS AND SYSTEMS

(75) Inventor: Richard J. Misiag, Bloomsbury, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 410 days.

(21) Appl. No.: 12/796,040

(22) Filed: Jun. 8, 2010

(65) Prior Publication Data

US 2011/0300837 A1    Dec. 8, 2011

(51) Int. Cl.
*H04W 4/00*    (2009.01)

(52) U.S. Cl.
USPC .......... 455/414.1; 455/456.2; 455/456.1; 455/456.3; 455/432.3; 707/769

(58) Field of Classification Search
USPC .......... 455/456.2, 456.3, 456.1, 456.5, 403, 455/414.1, 466, 426.1, 414.3, 439, 552.1, 455/432.3; 707/769
See application file for complete search history.

(56) References Cited

U.S. PATENT DOCUMENTS

| | | | |
|---|---|---|---|
| 6,553,310 B1* | 4/2003 | Lopke | 701/454 |
| 6,970,871 B1* | 11/2005 | Rayburn | 1/1 |
| 7,568,002 B1* | 7/2009 | Vacanti et al. | 709/203 |
| 7,599,852 B2* | 10/2009 | Bosarge et al. | 705/14.49 |
| 7,603,360 B2* | 10/2009 | Ramer et al. | 1/1 |
| 7,769,596 B1* | 8/2010 | Nair | 705/1.1 |
| 7,966,309 B2* | 6/2011 | Shacham et al. | 707/708 |
| 8,055,642 B2* | 11/2011 | Boal et al. | 707/706 |
| 8,086,690 B1* | 12/2011 | Heymans et al. | 709/217 |
| 8,112,435 B2* | 2/2012 | Epstein et al. | 707/769 |
| 8,135,617 B1* | 3/2012 | Agostino et al. | 705/14.4 |
| 8,140,111 B2* | 3/2012 | Wyler | 455/552.1 |
| 8,214,357 B2* | 7/2012 | Scott | 707/726 |
| 2003/0063128 A1* | 4/2003 | Salmimaa et al. | 345/810 |
| 2003/0142125 A1* | 7/2003 | Salmimaa et al. | 345/733 |
| 2004/0023666 A1* | 2/2004 | Moon et al. | 455/456.1 |
| 2005/0021862 A1* | 1/2005 | Schroeder et al. | 709/246 |
| 2006/0098899 A1* | 5/2006 | King et al. | 382/305 |
| 2006/0293959 A1* | 12/2006 | Hogan | 705/14 |
| 2007/0150355 A1* | 6/2007 | Meggs | 705/14 |
| 2007/0263069 A1* | 11/2007 | Jendbro | 348/14.02 |
| 2008/0046415 A1* | 2/2008 | Henkin et al. | 707/3 |
| 2008/0065649 A1* | 3/2008 | Smiler | 707/10 |
| 2008/0140476 A1* | 6/2008 | Anand et al. | 705/7 |
| 2008/0140520 A1* | 6/2008 | Hyder et al. | 705/14 |
| 2009/0024469 A1* | 1/2009 | Broder et al. | 705/14 |
| 2009/0037268 A1* | 2/2009 | Zaid et al. | 705/14 |
| 2009/0164993 A1* | 6/2009 | Flake et al. | 718/1 |
| 2009/0165134 A1* | 6/2009 | Flake et al. | 726/22 |

(Continued)

OTHER PUBLICATIONS

Vibrant Media, Vibrant In-Text Advertising, 2 pages, http://www.vibrantmedia.com/in-text_advertising/faq.asp, as accessed on Jun. 8, 2010.

*Primary Examiner* — Kamran Afshar
*Assistant Examiner* — Mong-Thuy Tran

(57) ABSTRACT

An exemplary method includes detecting a request made by a mobile access device to access a web page that includes a display element, determining a geographic location of the mobile access device in response to the request, selecting enhanced content to be associated with the display element in accordance with the geographic location, and dynamically hyperlinking the display element to the enhanced content. Corresponding methods and systems are also described.

25 Claims, 10 Drawing Sheets

U.S. PATENT DOCUMENTS

| | | | |
|---|---|---|---|
| 2009/0197580 A1* | 8/2009 | Gupta et al. | 455/414.2 |
| 2009/0240564 A1* | 9/2009 | Boerries et al. | 705/10 |
| 2009/0308168 A1* | 12/2009 | Motoyama | 73/717 |
| 2010/0064018 A1* | 3/2010 | Luo | 709/206 |
| 2010/0082435 A1* | 4/2010 | Hartman | 705/14.55 |
| 2010/0094878 A1* | 4/2010 | Soroca et al. | 707/748 |
| 2010/0097629 A1* | 4/2010 | Takahashi | 358/1.14 |
| 2010/0115615 A1* | 5/2010 | Hubbard et al. | 726/22 |
| 2010/0205061 A1* | 8/2010 | Karmarkar | 705/14.64 |
| 2010/0211568 A1* | 8/2010 | Chu et al. | 707/732 |
| 2010/0217662 A1* | 8/2010 | Ramer et al. | 705/14.42 |
| 2010/0217690 A1* | 8/2010 | Lee et al. | 705/27 |
| 2010/0235256 A1* | 9/2010 | Kang | 705/27 |
| 2010/0241507 A1* | 9/2010 | Quinn et al. | 705/14.42 |
| 2010/0250136 A1* | 9/2010 | Chen | 701/300 |
| 2010/0331016 A1* | 12/2010 | Dutton et al. | 455/456.3 |
| 2011/0029398 A1* | 2/2011 | Boudville | 705/26.1 |
| 2011/0065451 A1* | 3/2011 | Danado et al. | 455/456.1 |
| 2011/0093515 A1* | 4/2011 | Albanese | 707/812 |
| 2011/0112824 A1* | 5/2011 | Sayers et al. | 704/9 |
| 2011/0113385 A1* | 5/2011 | Sayers et al. | 715/853 |
| 2011/0124318 A1* | 5/2011 | Ayer | 455/414.1 |
| 2011/0161070 A1* | 6/2011 | Chen et al. | 704/9 |
| 2011/0213655 A1* | 9/2011 | Henkin et al. | 705/14.49 |
| 2011/0258529 A1* | 10/2011 | Doig et al. | 715/234 |
| 2011/0279311 A1* | 11/2011 | Hamano | 342/357.25 |
| 2011/0289015 A1* | 11/2011 | Mei et al. | 705/347 |
| 2012/0232996 A1* | 9/2012 | Scott | 705/14.64 |

* cited by examiner

Great Food Blog

A hamburger (or burger for short) is a sandwich consisting of a cooked patty of ground meat, (usually beef, but occasionally pork, turkey, or a combination of meats) placed between two buns. They are often served with lettuce, bacon, tomato, onion, pickles, cheese and condiments such as mustard, mayonnaise, ketchup and relish.

LOCATION-BASED DYNAMIC HYPERLINKING METHODS AND SYSTEMS

BACKGROUND INFORMATION

Advances in electronic communications technologies have allowed for distribution of information perhaps better than ever before. To illustrate, mobile access devices (e.g., mobile phones) are increasingly being used by people to access the Internet while they are away from their home and office computers.

It is often desirable to present advertisements and other types of enhanced content to users who access the Internet from their mobile access devices. However, traditional forms of Internet advertising are disruptive and often not very effective when displayed by mobile access devices. Hence, it would be desirable to more effectively deliver advertisements and other enhanced content to mobile access device users without disrupting their Internet experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for dynamically hyperlinking a display element included in a web page in accordance with a geographic location of a mobile access device are described herein. As described in more detail below, a location-based dynamic hyperlinking system may be configured to detect a request made by a mobile access device to access a web page that includes a display element, determine a geographic location of the mobile access device in response to the request, select enhanced content to be associated with the display element in accordance with the geographic location, and dynamically hyperlink the display element to the enhanced content.

As used herein, the term "display element" refers to text (e.g., one or more words, characters, numbers, symbols, etc.), one or more images, one or more videos, one or more graphics, animation content (e.g., Flash content), and/or any other content that may be visually displayed in a web page. In some examples, a display element may be initially non-hyperlinked. A display element that is "initially non-hyperlinked" refers to a display element that would normally be displayed in a web page without being hyperlinked to other content in the absence of the location-based dynamic hyperlinking systems and methods described herein.

In some examples, a display element may be statically included in a web page. In other words, the display element may be displayed to all users who access the web page. For example, a display element may include text included in an article (e.g., a news article), a blog, or other posting displayed in a web page. Alternatively, a display element may be dynamically included in a web page. In other words, the display element may be automatically displayed in the web page only in certain contexts or in response to certain conditions. For example, a display element may include text that is displayed in response to a search query.

As used herein, the term "enhanced content" may include any content related to a particular display element included in a web page. For example, enhanced content may include, but is not limited to, a location-based advertisement, another web page, a map, a web-based search results list, and/or any other content as may serve a particular implementation.

Figure 1:
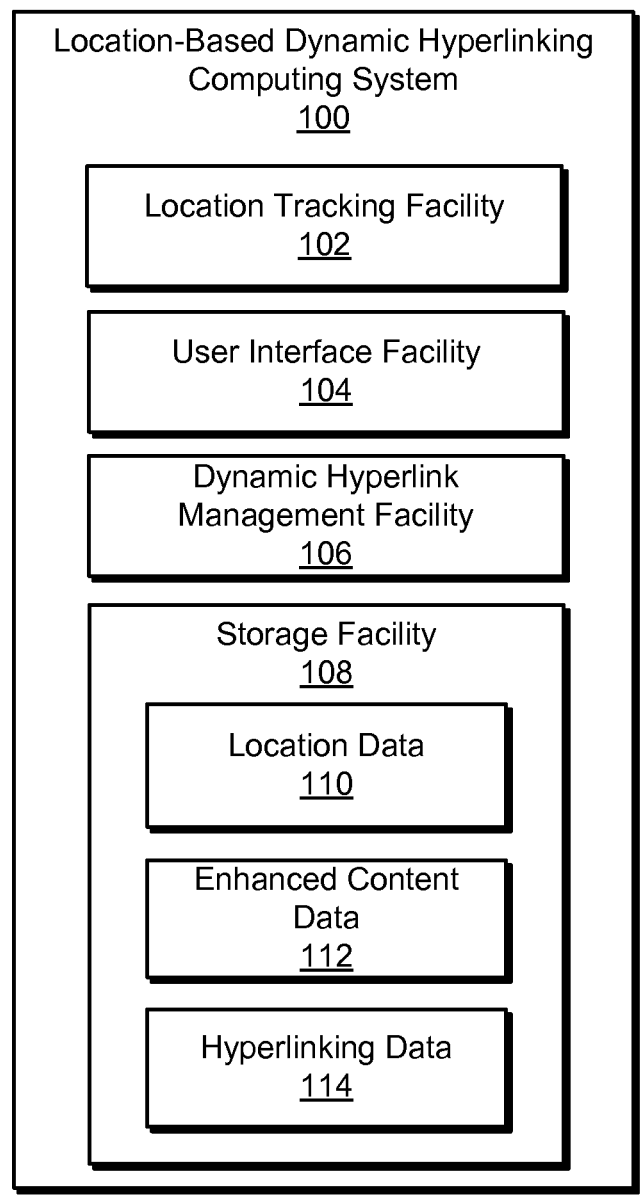
FIG. 1 illustrates an exemplary location-based dynamic hyperlinking computing system according to principles described herein.

FIG. 1 illustrates an exemplary location-based dynamic hyperlinking computing system 100 (or simply "system 100"). As will be described in more detail below, system 100 may be configured to facilitate automatic and dynamic hyperlinking of a display element included in a web page accessed by a mobile access device (e.g., a web-enabled mobile phone) in accordance with a detected geographic location of the mobile access device. System 100 may include, but is not limited to, a location tracking facility 102, a user interface facility 104, a dynamic hyperlink management facility 106, and a storage facility 108 selectively and communicatively coupled to one another. Each of these facilities will now be described in more detail.

Location tracking facility 102 may be configured to track (e.g., detect) a geographic location of a mobile access device associated with a user. The tracking of the geographic location of the mobile access device may be performed in any suitable way and using any suitable technologies, including, without limitation, Global Positioning System ("GPS") technologies and terrestrial signaling triangulation technologies. As an example, a mobile access device may include a mobile phone device, the location of which may be tracked using GPS and/or cellular phone wireless signaling triangulation technologies. In certain embodiments, location tracking facility 102 may track the geographic location of a mobile access device relative to (e.g., within) a particular geographic space (e.g., within a site premises). One or more wireless signaling transmitters may be employed to boost reception of location tracking signals within a site premises.

In some examples, location tracking facility 102 may be configured to detect an exact location (e.g., latitude and longitude coordinates) of a mobile access device. Alternatively, location tracking facility 102 may be configured to detect an approximate location (e.g., by way of triangulation) of the mobile access device.

In some examples, as will be described in more detail below, location tracking facility 102 may determine a geographic location of a mobile access device in response to a request made by the mobile access device to access a web page. The determination of the geographic location of the mobile access device may be performed at the time that the mobile access device performs the request to access the web page. Additionally or alternatively, location tracking facility 102 may detect a geographic location of the mobile access device at any time before or after the requested web page has been initially accessed by the mobile access device.

User interface facility 104 may be configured to provide one or more user interfaces configured to facilitate user interaction with system 100. For example, user interface facility 104 may provide a user interface through which one or more functions, options, features, and/or tools may be provided to a user and through which user input may be received. In certain embodiments, user interface facility 104 may be configured to direct a mobile access device to display one or more web pages, enhanced content, and/or any other content as may serve a particular implementation.

Dynamic hyperlink management facility 106 may be configured to manage (e.g., create, maintain, update, etc.) one or more dynamic hyperlinks that may be included in a web page. For example, dynamic hyperlink management facility 106 may detect a request made by a mobile access device to access a web page comprising a display element displayed therein. As will be described in more detail below, the display element may be initially non-hyperlinked, statically included in the web page, and/or otherwise included in the web page as may serve a particular implementation. In response to the request, dynamic hyperlink management facility 106 may select enhanced content (e.g., a website of an advertiser) to be associated with the display element included in the web page in accordance with a geographic location of the mobile access device as detected by location tracking facility 102. Dynamic hyperlink management facility 106 may be further configured to dynamically hyperlink the display element to the enhanced content. Examples of location-based dynamic hyperlinking performed by dynamic hyperlink management facility 106 will be described in more detail below.

To facilitate location-based dynamic hyperlinking, dynamic hyperlink management facility 106 may be further configured to analyze display elements (e.g., one or more attributes of display elements) included in a web page to determine whether the web page includes one or more display elements that are to be hyperlinked to enhanced content in accordance with the systems and methods described herein. For example, as will be described in more detail below, dynamic hyperlink management facility 106 may scan text included in a web page to identify one or more words in the web page that match words included in an enhanced content association table that defines location-based associations between various words that may be included in a web page and various instances of enhanced content. Additionally or alternatively, dynamic hyperlink management facility 106 may identify non-textual display elements (e.g., images, graphics, Flash content, and videos) using any suitable analysis heuristic (e.g., contextual text analysis) in order to compare the non-textual display elements to non-textual display elements included in the enhanced content association table.

Analysis of display elements included in a web-page may be performed by dynamic hyperlink management facility 106 in any suitable manner. For example, dynamic hyperlink management facility 106 may attach a Java script module or the like to the web page and use the Java script module to scan the contents of the web page.

Upon identification of a particular display element included in a web page that matches a display element included in the enhanced content association table, dynamic hyperlink management facility 106 may associate enhanced content with the identified display element in accordance with the location-based association rules defined in the enhanced content association table. Examples of such association will be described in more detail below.

Dynamic hyperlink management facility 106 may be further configured to disassociate enhanced content with a display element included in a web page. For example, dynamic hyperlink management facility 106 may initially hyperlink a display element included in a web page to an advertisement for a product vendor located within a predetermined distance of a geographic location of a mobile access device. Location tracking facility 102 may then detect that the mobile access device has been moved (e.g., carried by a user) to a new location. In response to the detection of the new geographic location, dynamic hyperlink management facility 106 may disassociate the display element with the advertisement, select a new advertisement (e.g., for a product vendor located within a predetermined distance of the new geographic location) to be associated with the display element, and dynamically update the display element to be hyperlinked to the new advertisement.

Storage facility 108 may be configured to maintain location data 110 representative of a geographic location of a mobile access device, enhanced content data 112 representative of enhanced content, and hyperlinking data 114 representative of data utilized by dynamic hyperlink management facility 106. It will be recognized that storage facility 108 may maintain additional or alternative data as may serve a particular implementation.

Figure 2:
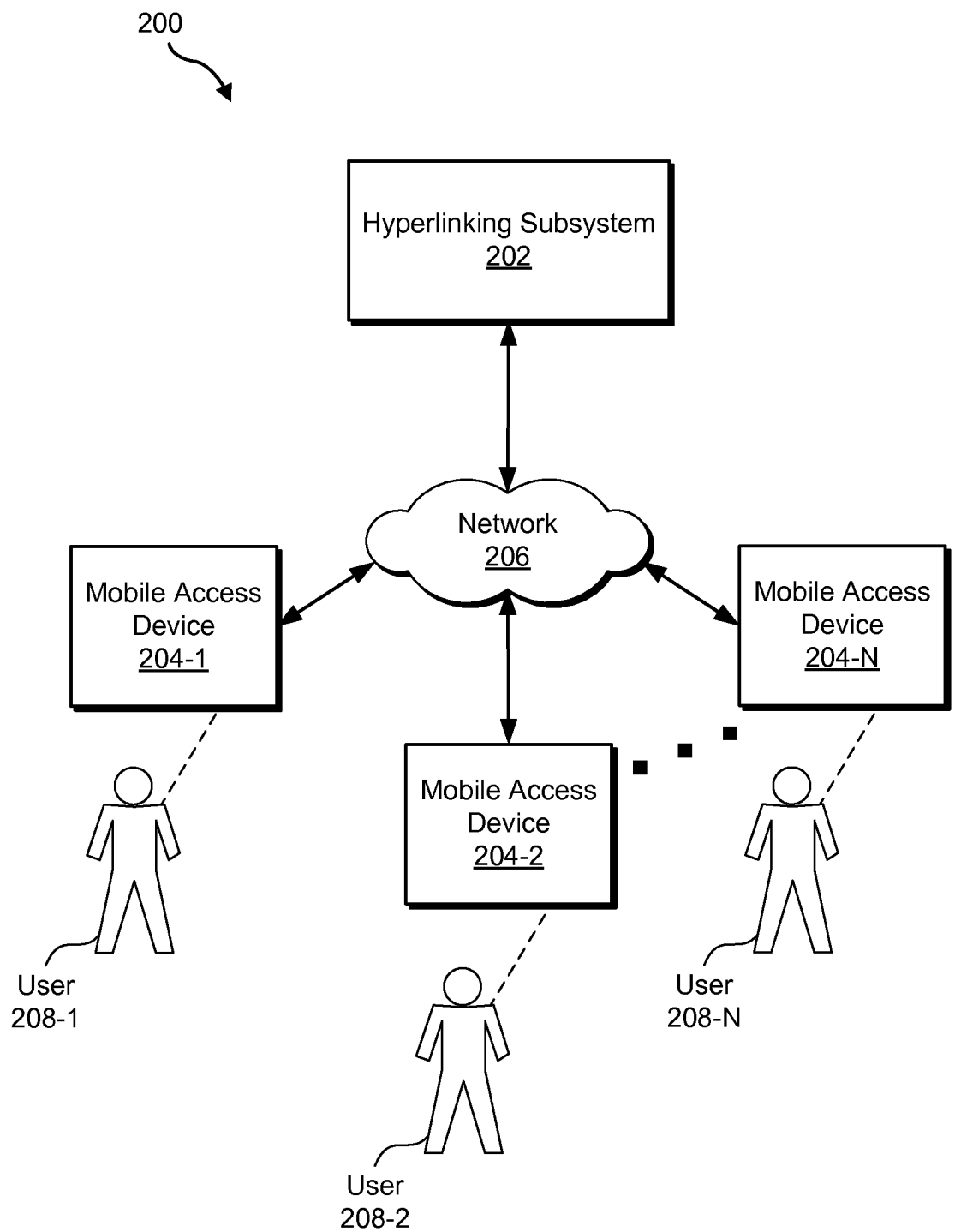
FIG. 2 illustrates an exemplary implementation of the system of FIG. 1 according to principles described herein.

FIG. 2 illustrates an exemplary implementation 200 of system 100. As shown in FIG. 2, implementation 200 may include a hyperlinking subsystem 202 selectively and communicatively coupled to a plurality of user mobile access devices 204 (e.g., mobile access devices 204-1 through 204-N).

Mobile access devices 204 and hyperlinking subsystem 202 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, mobile access devices 204 and hyperlinking subsystem 202 may communicate via a network 206, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, and any other networks capable of carrying data and/or communications signals between mobile access devices 204 and hyperlinking subsystem 202. Communications between hyperlinking subsystem 202 and mobile access devices 204 may be transported using any one of above-listed networks, or any combination or sub-combination of the above-listed networks. In certain exemplary embodiments, network 206 includes a mobile telephone network.

Mobile access devices 204 may be associated with a plurality of users 208 (e.g., users 208-1 through 208-N), which in certain embodiments may be subscribers to or end users of one or more services (e.g., a wireless telephone service) provided over network 206. Mobile access devices 204 may each include any mobile device configured to perform one or more of the mobile access device operations described herein, including communicating with hyperlinking subsystem 202 by way of network 206. Mobile access device 204 may include, but is not limited to, a wireless computing device, a wireless communication device (e.g., a mobile phone configured to access one or more services provided over network 206), a portable computing device (e.g., a laptop computer), a portable communication device, a personal digital assistant, a vehicular computing and/or communication device, a portable navigation device, a personal media player device, a mobile computing device tethered to a personal computer or vice versa, and/or any other mobile access device configured to perform one or more of the mobile access device operations described herein.

In certain embodiments, mobile access devices 204 may be associated with heterogeneous communication platforms, and hyperlinking subsystem 202 may be configured to communicate with each of the heterogeneous platforms. Accordingly, various types of mobile access devices 204 associated with various communication platforms may be used by consumers to access one or more of the features and/or processes described herein.

In certain embodiments, system 100 may be implemented entirely by or within hyperlinking subsystem 202. In other embodiments, components of system 100 may be distributed across hyperlinking subsystem 202 and mobile access devices 204. For example, a mobile access device 204 may include a client (e.g., a client application) implementing one or more of the facilities of system 100.

Figure 3:
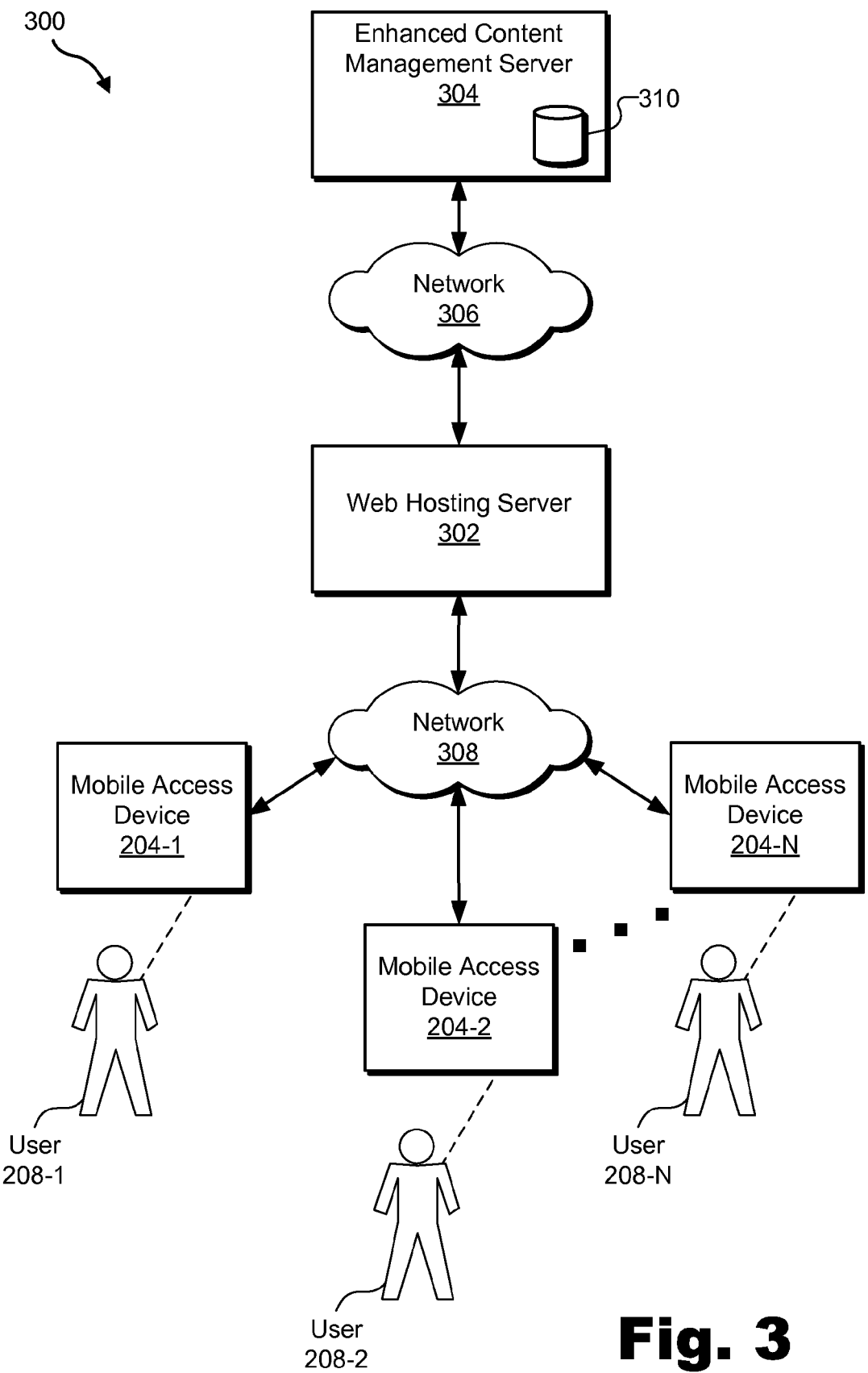
FIG. 3 illustrates another exemplary implementation of the system of FIG. 1 according to principles described herein.

Hyperlinking subsystem 202 may include one or more computing devices (e.g., one or more server devices) implementing one or more components of system 100. For example, FIG. 3 illustrates another exemplary implementation 300 of system 100 wherein hyperlinking subsystem 202 is implemented by a web hosting server 302 and an enhanced content management server 304. Web hosting server 302 and enhanced content management server 304 may be configured to communicate by way of network 306, which may include any of the networks described herein.

Web hosting server 302 may be configured to host one or more web pages to which one or more of mobile access devices 204 may request access. Web hosting sever 302 may be configured to communicate with mobile access devices 204 by way of network 308, which may include any of the networks described herein.

Enhanced content management server 304 may be configured to maintain a relational database 310 that includes data representative of the enhanced content association table described herein. Exemplary contents of relational database 310 will be described in more detail below.

In some examples, web hosting server 302 and/or enhanced content management server 304 may include a client (e.g., a Java script module) configured to analyze display elements included in a web page and identify one or more display elements that match display elements listed in the enhanced content association table maintained by relational database 310. In this manner, as will be described in more detail below, the identified display element may be hyperlinked to appropriate enhanced content.

Figure 4:
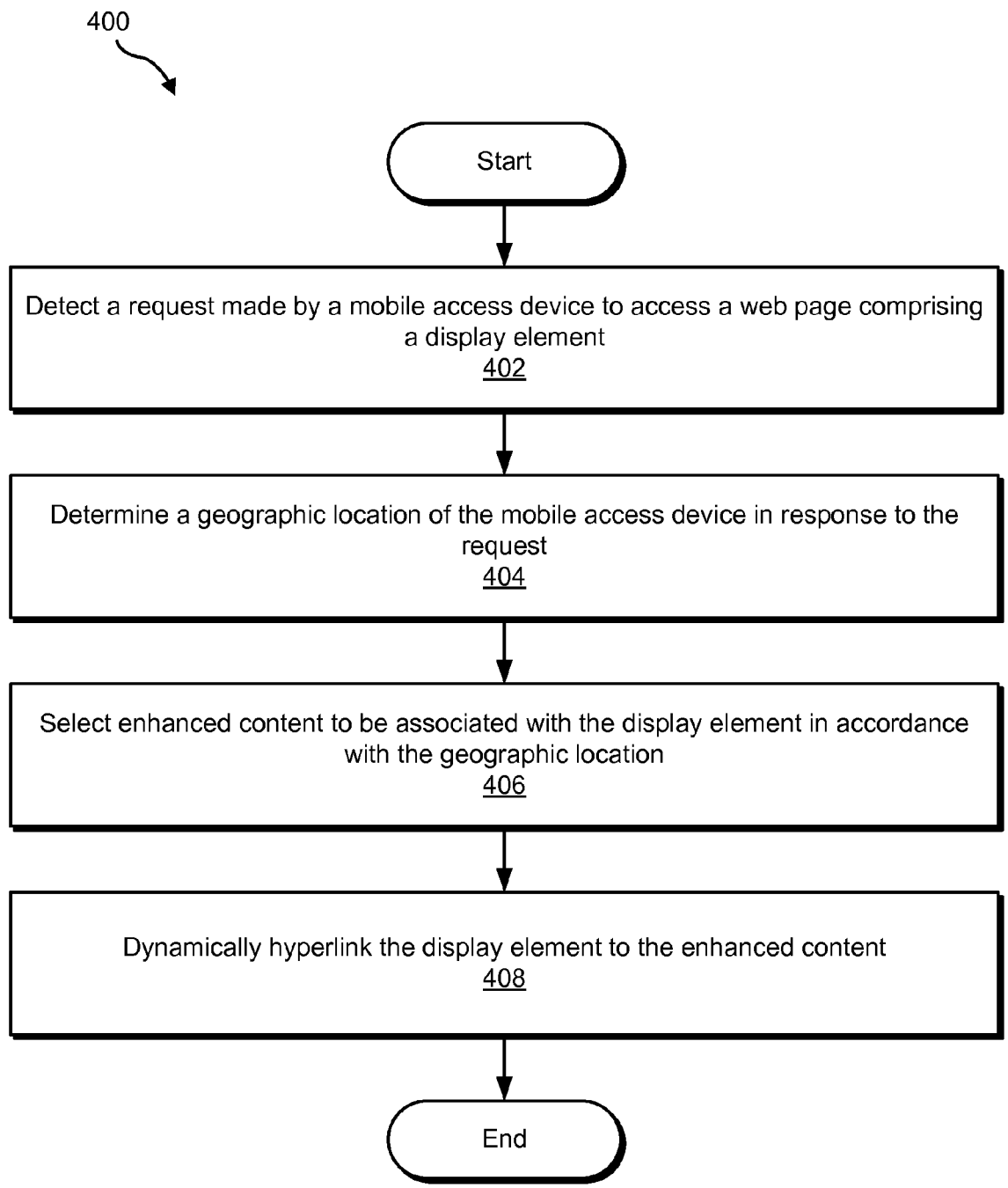
FIG. 4 illustrates an exemplary location-based dynamic hyperlinking method according to principles described herein.

FIG. 4 illustrates an exemplary location-based dynamic hyperlinking method 400. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100, hyperlinking subsystem 202, mobile access device 204, web hosting server 302, and/or enhanced content management server 304 as may serve a particular implementation.

In step 402, a request made by a mobile access device to access a web page comprising a display element is detected. The request may be detected in any suitable manner as may serve a particular implementation. In some examples, the display element included within the web page is initially non-hyperlinked. Additionally or alternatively, the display element may be statically included in the web page.

In step 404, a geographic location of the mobile access device is determined in response to the request made by the mobile access device to access the web page. The geographic location may be determined in any of the ways described herein. In some examples, the geographic location of the mobile access device may be determined at the time that the request to access the web page is made by the mobile access device. Additionally or alternatively, as will be described in more detail below, the geographic location of the mobile access device may be determined at any time after the web page is initially accessed by the mobile access device.

In step 406, enhanced content is selected to be associated with the display element in accordance with the geographic location determined in step 404. The enhanced content may be associated with the display element in any of the ways described herein. Exemplary enhanced content that may be associated with a display element will be described in more detail below.

In step 408, the display element is dynamically hyperlinked to the enhanced content. The display element may be dynamically hyperlinked in any suitable manner as may serve a particular implementation. Once the display element has been dynamically hyperlinked to the enhanced content, the mobile access device may be directed to display the web page with the dynamically hyperlinked display element displayed therein.

Various examples that implement the location-based dynamic hyperlinking method 400 of FIG. 4 will now be presented. It will be recognized that the examples presented herein are merely illustrative of the many different implementations of method 400.

Figure 5:
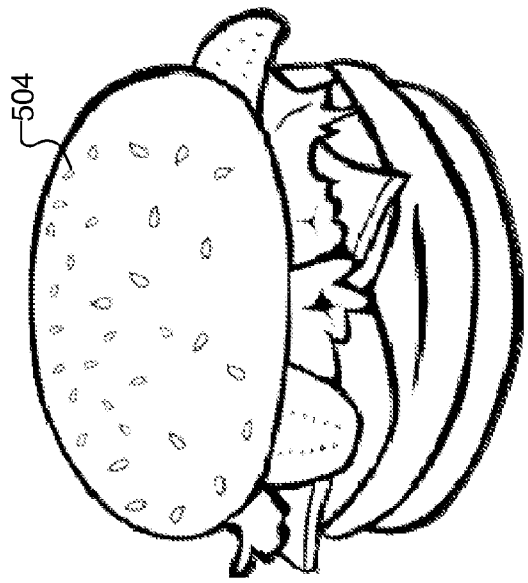
FIG. 5 illustrates an exemplary web page that may be accessed and displayed by a mobile access device according to principles described herein.

FIG. 5 illustrates an exemplary web page 500 that may be accessed and displayed by a mobile access device. Web page 500 may be defined and/or generated in any suitable manner as may serve a particular implementation. For example, web page 500 may be defined using hypertext markup language ("HTML") and/or any other suitable web programming language.

As shown in FIG. 5, web page 500 may include various display elements displayed therein. For example, web page 500 includes a body of text 502 comprising a plurality of words and an image 504. It will be assumed that text 502 and image 504 are initially non-hyperlinked and statically included in web page 500 in the examples given herein. It will be recognized that web page 500 may include additional or alternative types of display elements as may serve a particular implementation.

In some examples, a user of a mobile access device may desire to access web page 500. To this end, the user may direct the mobile access device to transmit data representative of a request to access web page 500 to a web hosting server (e.g., web hosting server 302) or the like. In response, the web hosting server may transmit data representative of the requested web page 500 to the mobile access device for display by the mobile access device.

In some examples, a content provider associated with web page 500 (e.g., an owner, service provider, or any other entity associated with web page 500) may desire to provide one or more users with enhanced content associated with one or more of the display elements displayed in web page 500. To this end, the content provider, or a third-party entity contracted or otherwise associated with the content provider, may dynamically hyperlink the one or more display elements to one or more instances of enhanced content. The dynamic hyperlinking may be location-based, thereby facilitating customization of the enhanced content presented to the one or more users based on a geographic location of the one or more users.

Figure 6:
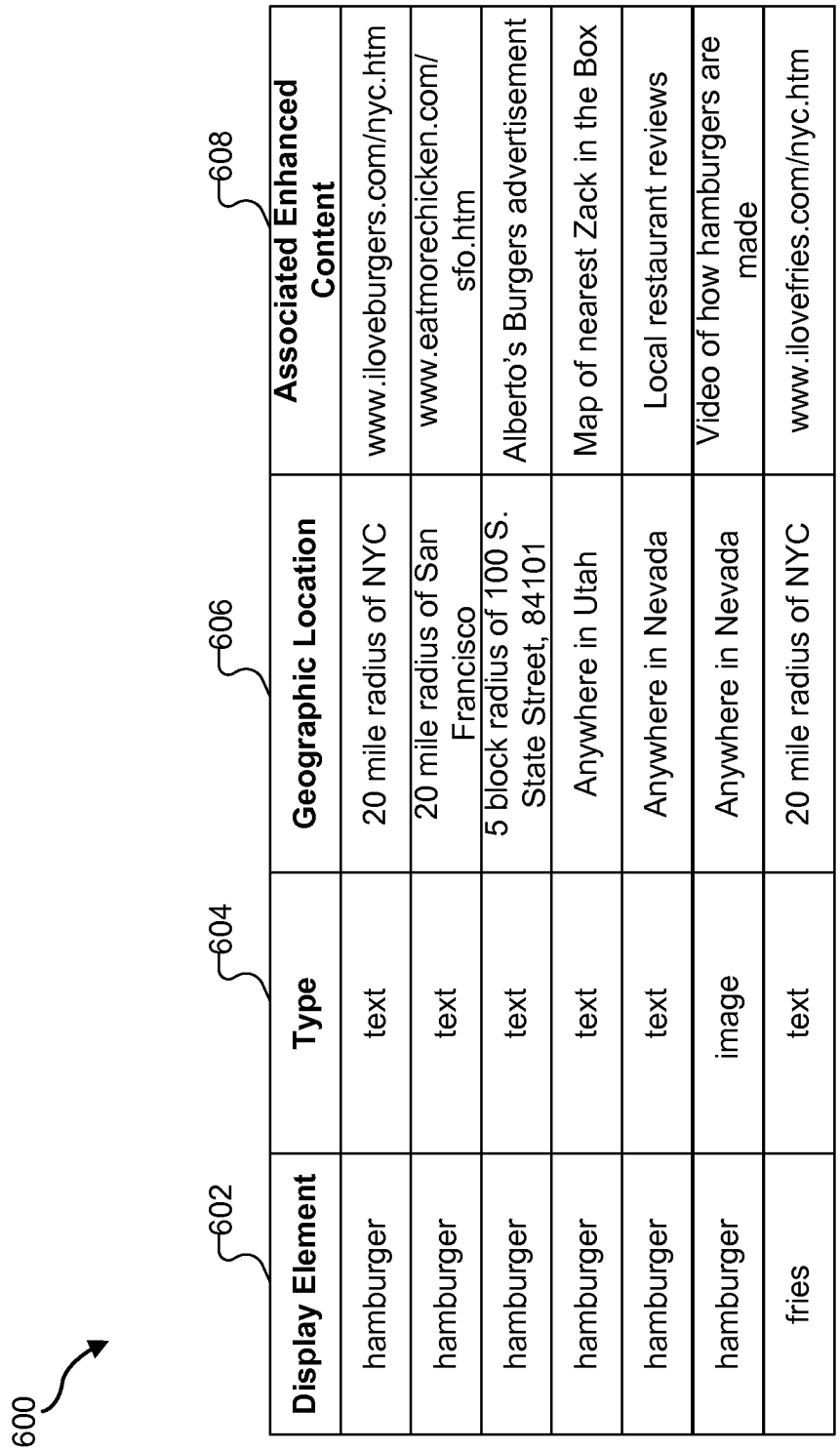
FIG. 6 illustrates an exemplary enhanced content association table according to principles described herein.

In some examples, dynamic hyperlink management facility 106 may maintain an enhanced content association table that defines location-based associations between various display elements that may be included in a web page and various instances of enhanced content. FIG. 6 illustrates an exemplary enhanced content association table 600 that may be maintained and used by dynamic hyperlink management facility 106. Enhanced content association table 600 is merely illustrative of the many different manners in which location-based association rules may be defined and used to associate various instances of enhanced content with various display elements included in a web page.

As shown in FIG. 6, enhanced content association table 600 may include a "display element" column 602, a "type" column 604, a "geographic location" column 606, and an "associated enhanced content" column 608. Display element column 602 lists various display elements that may be included in a web page (e.g., the words "hamburger" and "fries"). Type column 604 defines the particular type (e.g., text, image, etc.) of each of the listed display elements. Geographic location column 606 provides a location-based association rule for each of the listed display elements. Associated enhanced content column 608 lists various instances of enhanced content that may possibly be associated with the listed display elements in accordance with the location-based association rules.

To illustrate, enhanced content association table 600 indicates that if a mobile access device requests access to a web page containing the word "hamburger" while located at a geographic location that is within a 20 mile radius of New York City, dynamic hyperlink management facility 106 may select a web page having a uniform resource locator ("URL") of "www.iloveburgers.com/NYC.htm" to be associated with the word "hamburger." Dynamic hyperlink management facility 106 may then dynamically hyperlink one or more instances of the word "hamburger" in the web page accessed by the mobile access device so that a user may access enhanced content specific to the real-time geographic location of the user.

However, as shown in FIG. 6, if the mobile access device is located within 20 miles of San Francisco when the request to access the web page is made, dynamic hyperlink management facility 106 may select a web page having a URL of "www.eatmorechicken.com/sfo.com" to be associated with the word "hamburger". In this manner, the particular instance of enhanced content that is selected to be associated with a display element may be customized to the user depending on the location of the user.

Other location-based rules for the word "hamburger" are shown in FIG. 6. For example, FIG. 6 shows that an advertisement for "Alberto's Burgers" may associated with the word "hamburger" if the mobile access device is within a five block radius of 100 S. State Street located in a region defined by the zip code 84101, a map of the nearest "Zack in the Box" may be associated with the word "hamburger" if the mobile access device is located anywhere in Utah, and a list of local restaurant reviews may be associated with the word "hamburger" if the mobile access device is located anywhere in Nevada.

As shown in FIG. 6, enhanced content association table 600 may additionally or alternatively define location-based association rules for non-textual display elements. For example, if a mobile access device requests access to a web page containing an image of a hamburger while located at a geographic location that is anywhere in Nevada, dynamic hyperlink management facility 106 may select a video to be associated with the image.

In some examples, conflicts that may arise when a geographic location of a mobile access device satisfies multiple location-based rules defined in enhanced content association table 600 may be resolved in accordance with one or more predefined priority rules. For example, 84101 is a zip code corresponding to a particular region in the state of Utah. Hence, it is possible for a geographic location of a mobile access device to be both within a "five block radius of 100 S. State Street" and "anywhere in Utah." An exemplary priority rule may specify that the more specific geographic location condition (i.e., the five block radius) is to be selected in the event of a conflict. Additional and/or alternative priority rules may be used as may suit a particular implementation.

In some examples, one or more location-based association rules and/or priority rules may be determined based on financial consideration provided to a service provider by one or more advertisers and/or vendors. For example, advertisers may bid for a particular location-based association rule and/or preferred placement within one or more priority rules.

Returning to FIG. 5, dynamic hyperlink management facility 106 may analyze the display elements included in web page 500 to determine whether web page 500 includes one or more display elements that match one or more of the display elements included in enhanced content association table 600. For example, dynamic hyperlink management facility 106 may scan the words included in text 502 and determine that the word "hamburger" is included in enhanced content association table 600. Dynamic hyperlink management facility 106 may then select one of the instances of enhanced content listed in column 608 of enhanced content association table 600 to be associated with the word "hamburger" based on a geographic location of the mobile access device at the time that the request is made to access web page 500 and dynamically hyperlink the word "hamburger" to the selected enhanced content.

Figure 7:
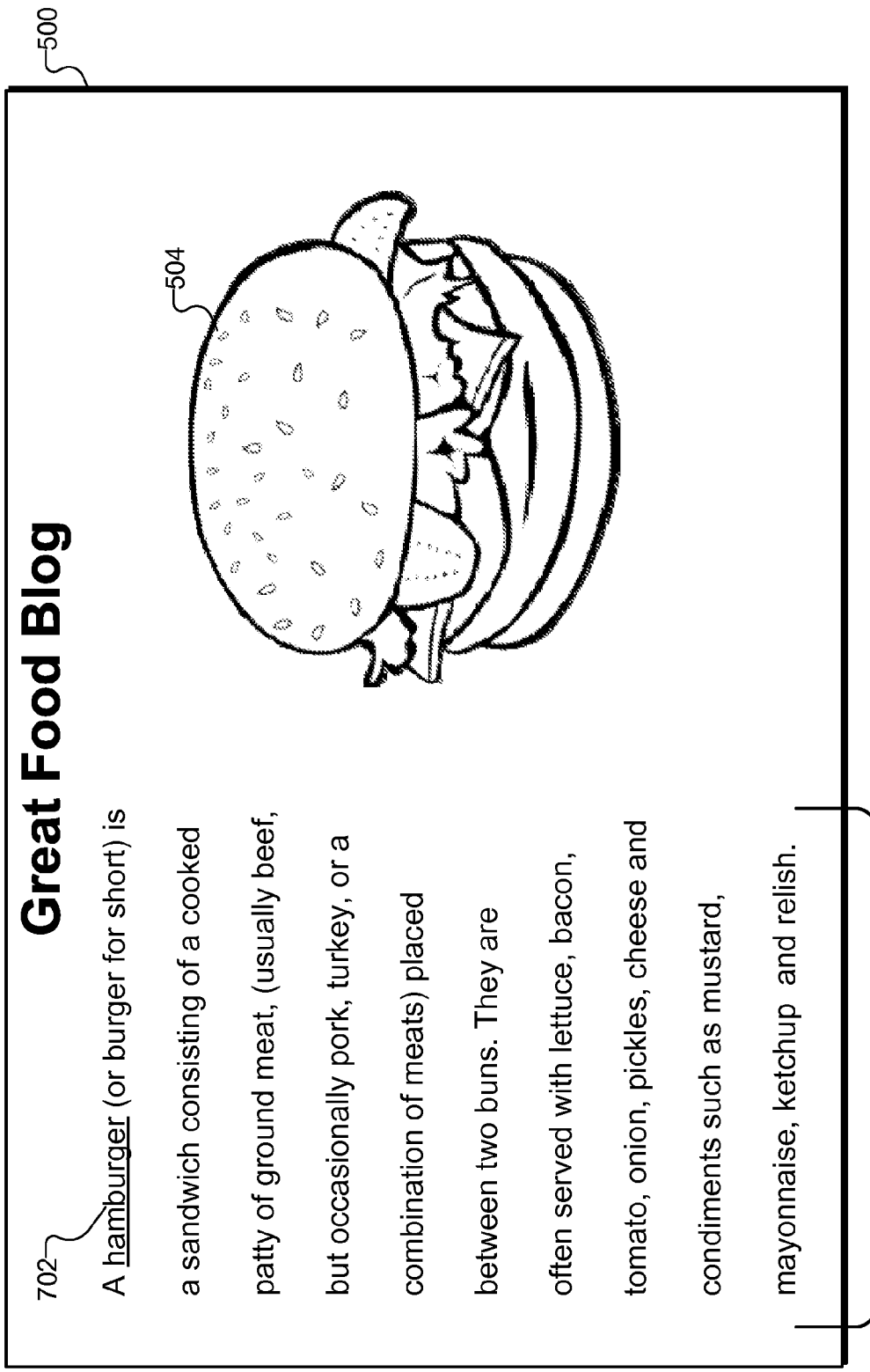
FIG. 7 shows the web page of FIG. 5 with a dynamically hyperlinked word included therein according to principles described herein.

Once the word "hamburger" has been dynamically hyperlinked, dynamic hyperlink management facility 106 may direct the mobile access device to display web page 500 with the dynamically hyperlinked word displayed therein. For example, FIG. 7 shows that the word "hamburger" 702 has been hyperlinked to enhanced content. As shown in FIG. 7, word 702 may be underlined to indicate that it is hyperlinked to enhanced content. Word 702 may additionally or alternatively be marked in any other manner to indicate that it is hyperlinked. For example, word 702 may be displayed as having a distinct color, font, size, or other attribute. Additionally or alternatively, in the event that word 702 is initially hyperlinked before being dynamically hyperlinked in accordance with a geographic location of a mobile access device, an appearance of word 702 may be altered to indicate that it has been dynamically hyperlinked.

In some examples, a user of the mobile access device may select hyperlinked word 702 to access the enhanced content associated with the hyperlinked word. The enhanced content may be displayed in a separate web page, for example. Additionally or alternatively, at least a portion of the enhanced content may be included in a pop-up window overlaying at least a portion of the display of web page 500. In some examples, the pop-up window may be displayed in response to a positioning of a cursor over the hyperlinked word 702.

Figure 8:
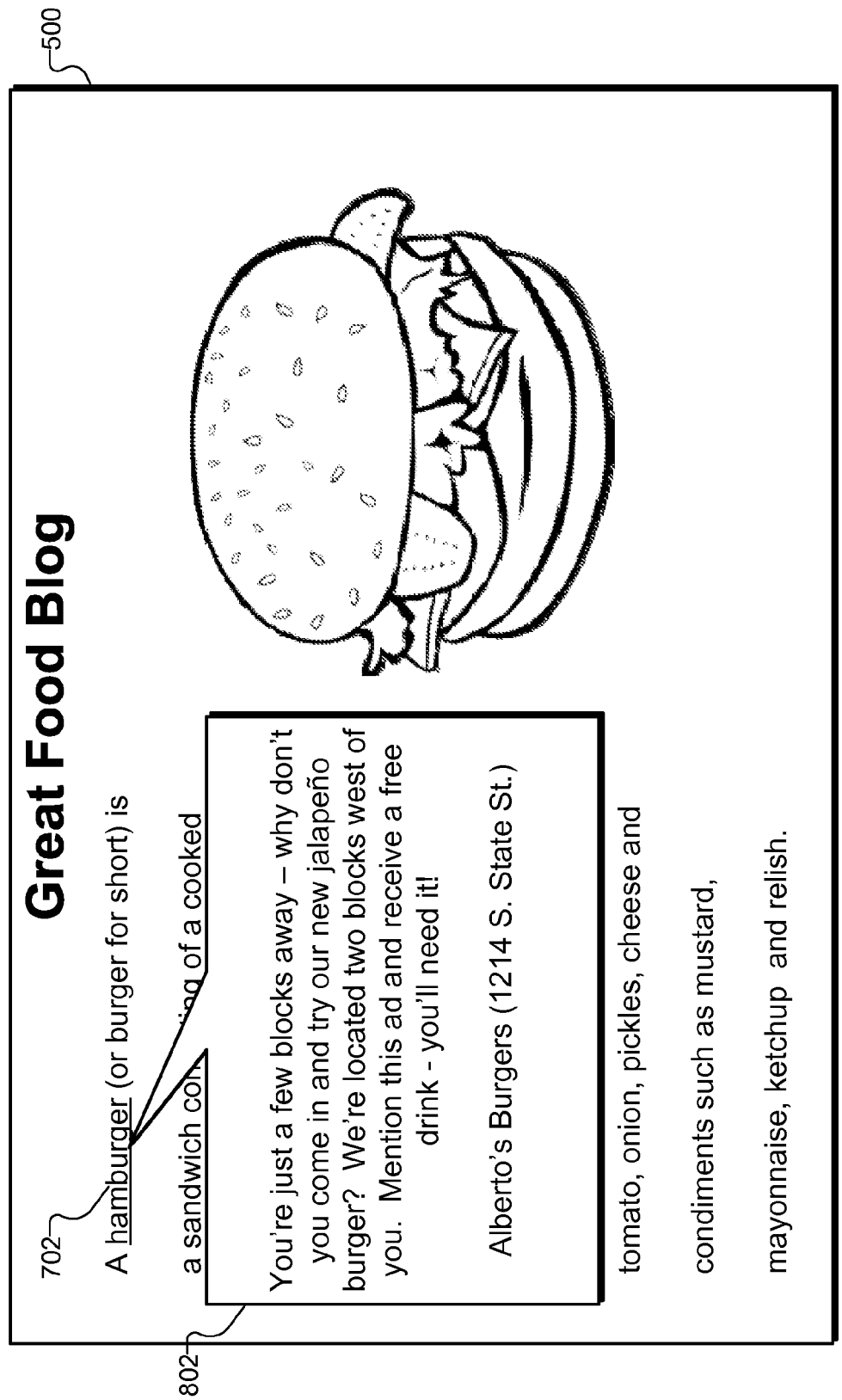
FIG. 8 shows a pop-up window overlaying at least at portion of the display of the web page of FIG. 5 according to principles described herein.

To illustrate, FIG. 8 shows a pop-up window 802 overlaying at least at portion of the display of web page 500. As shown in FIG. 8, pop-up window may include enhanced content (e.g., an advertisement provided by Alberto's Burgers) associated with hyperlinked word 702. Pop-up window 802 may facilitate previewing or otherwise accessing enhanced content without having to navigate away from web page 500.

In some examples, the user of the mobile access device that has accessed web page 500 may move to a new geographic location. Location detection facility 102 may detect the movement and determine an updated geographic location of the mobile access device in response to the movement. If the mobile access device has moved outside the geographic vicinity used to initially associate enhanced content with a display element included in the web page (e.g., the word "hamburger"), dynamic hyperlink management facility 106 may automatically disassociate the enhanced content with the display element. Dynamic hyperlink management facility 106 may then select another instance of enhanced content to be associated with the display element "hamburger" in accordance with the updated geographic location.

For example, if the user is initially located within a five block radius of 100 S. State Street when the mobile access device requests access to web page 500, the word "hamburger" 702 may be dynamically hyperlinked to an advertisement for "Alberto's Burgers" in accordance with enhanced content association table 600. The user may then move outside of the five block radius. In response, dynamic hyperlink management facility 106 may disassociate the advertisement with word 702, select another instance of enhanced content (e.g., a map of the nearest "Zack in the Box"), and dynamically update word 702 to be hyperlinked to the other enhanced content instance. Such dynamic updating may be performed automatically and transparently to the user. For example, the updating may be performed while web page 500 is still accessed (e.g., displayed) by the mobile device.

Figure 9:
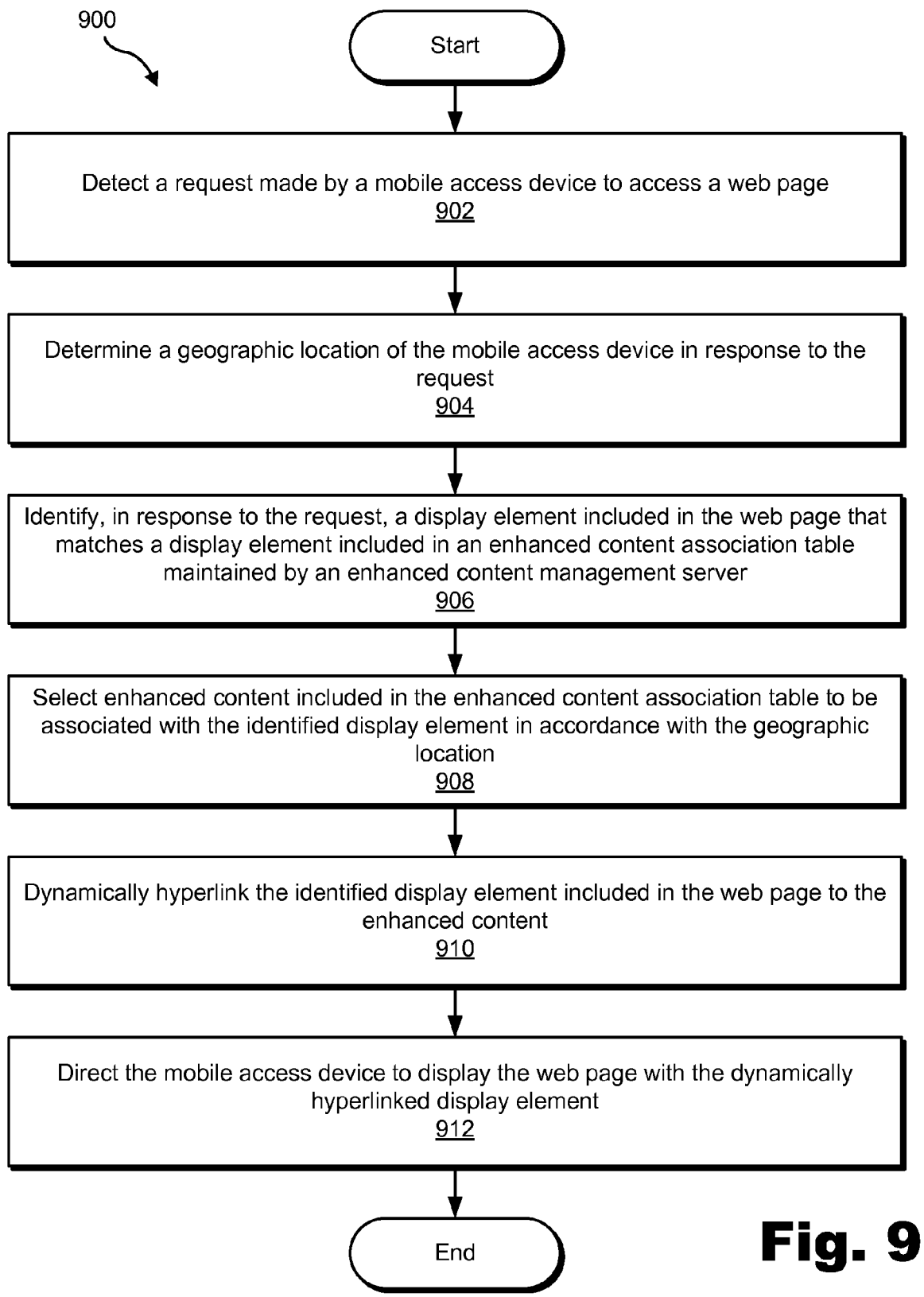
FIG. 9 illustrates another exemplary location-based dynamic hyperlinking method according to principles described herein.

FIG. 9 illustrates another exemplary location-based dynamic hyperlinking method 900. While FIG. 9 illustrates exemplary steps according to one embodiment, other embodiments may omit, add to, reorder, and/or modify any of the steps shown in FIG. 9. The steps shown in FIG. 9 may be performed by any component or combination of components of system 100, hyperlinking subsystem 202, mobile access device 204, web hosting server 302, and/or enhanced content management server 304 as may serve a particular implementation.

In step 902, a request made by a mobile access device to access a web page is detected. Step 902 may be performed in any of the ways described herein.

In step 904, a geographic location of the mobile access device is determined in response to the request. Step 904 may be performed in any of the ways described herein.

In step 906, in response to the request made in step 902, a display element included in the web page is identified that matches a display element included in an enhanced content association table maintained by an enhanced content management server. Step 906 may be performed in any of the ways described herein.

In step 908, enhanced content included in the enhanced content association table is selected to be associated with the identified display element in accordance with the geographic location. Step 908 may be performed in any of the ways described herein.

In step 910, the identified display element included in the web page is dynamically hyperlinked to the enhanced content. Step 910 may be performed in any of the ways described herein.

In step 912, the mobile access device is directed to display the web page with the dynamically hyperlinked display element. Step 912 may be performed in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 10:
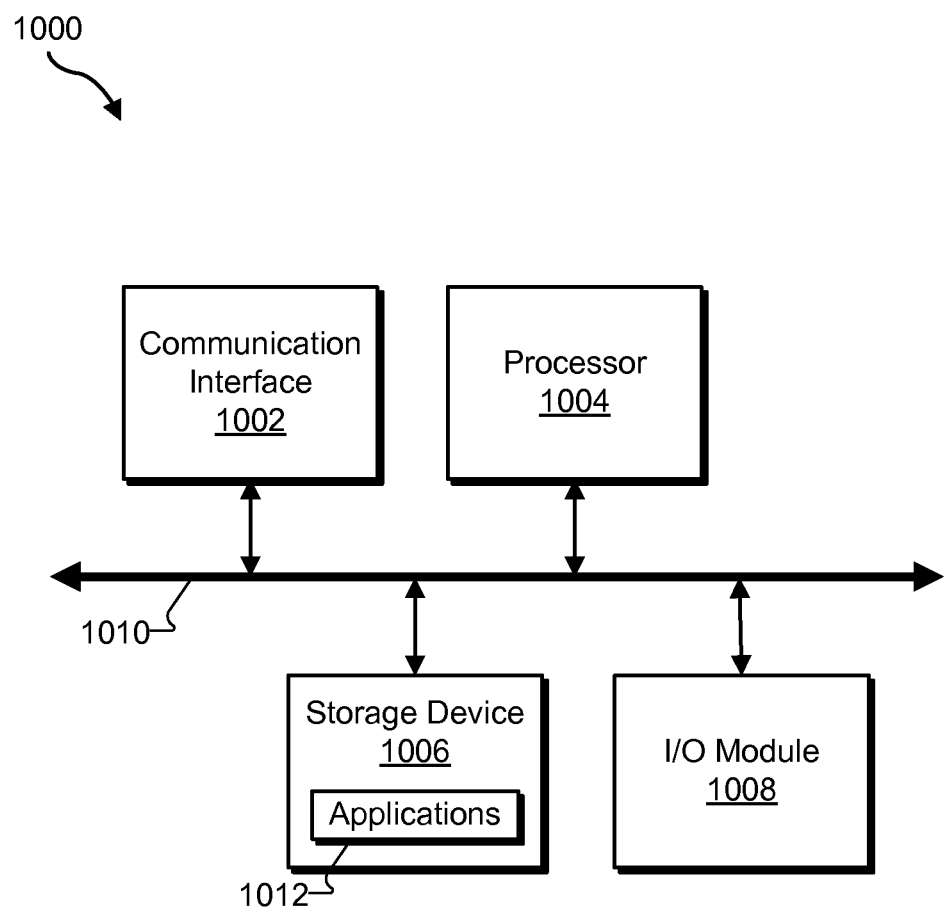
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another non-transitory computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with location tracking facility 102, user interface facility 104, and/or dynamic hyperlink management facility 106. Likewise, storage facility 108 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a location-based dynamic hyperlinking computing system, a request made by a mobile access device to access a web page;
   determining, by the location-based dynamic hyperlinking computing system, a geographic location of the mobile access device in response to the request;
   scanning, by the location-based dynamic hyperlinking computing system in response to the determining of the geographic location of the mobile access device, the web page to identify a display element that is initially non-hyperlinked;
   selecting, by the location-based dynamic hyperlinking computing system, enhanced content to be associated with the display element in accordance with the geographic location; and
   dynamically hyperlinking, by the location-based dynamic hyperlinking computing system, the display element to the enhanced content.

2. The method of claim 1, further comprising directing, by the location-based dynamic hyperlinking computing system, the mobile access device to display the web page with the dynamically hyperlinked display element.

3. The method of claim 2, further comprising directing, by the location-based dynamic hyperlinking computing system, the mobile access device to display at least a portion of the enhanced content in a pop-up window overlaying at least a portion of the display of the web page in response to a positioning of a cursor over the dynamically hyperlinked display element.

4. The method of claim 2, further comprising:
   determining, by the location-based dynamic hyperlinking computing system while the web page is still accessed by the access device, an updated geographic location of the mobile access device in response to a movement of the mobile access device;
   disassociating, by the location-based dynamic hyperlinking computing system, the enhanced content with the display element;

selecting, by the location-based dynamic hyperlinking computing system, other enhanced content to be associated with the display element in accordance with the updated geographic location; and dynamically updating, by the location-based dynamic hyperlinking computing system while the web page is still accessed by the mobile access device, the display element to be hyperlinked to the other enhanced content.

5. The method of claim 1, further comprising providing, by the location-based dynamic hyperlinking computing system, a user with access to the enhanced content in response to a selection by the user of the dynamically hyperlinked display element.

6. The method of claim 5, wherein the enhanced content comprises an additional web page, and wherein the providing the user with access to the enhanced content comprises directing the mobile access device to display the additional web page.

7. The method of claim 1, wherein the geographic location of the mobile access device comprises latitude and longitude coordinates of the mobile access device.

8. The method of claim 1, wherein the determining of the geographic location of the mobile access device is performed in accordance with at least one of a Global Positioning System ("GPS") heuristic and a wireless signaling triangulation heuristic.

9. The method of claim 1, wherein the display element comprises at least one of text, an image, a graphic, a video, and animation content.

10. The method of claim 1, wherein the enhanced content comprises at least one of another web page associated with the dynamically hyperlinked display element, a location-based advertisement associated with the dynamically hyperlink display element, a map associated with the dynamically hyperlinked display element, and a web-based search results list associated with the dynamically hyperlinked display element.

11. The method of claim 1, wherein the display element comprises a display element statically included in the web page.

12. The method of claim 1, embodied as computer-executable instructions on at least one non-transitory computer-readable medium.

13. The method of claim 1, wherein the selecting the enhanced content is performed in accordance with one or more location-based priority rules.

14. The method of claim 13, wherein the one or more location-based priority rules are determined based on financial consideration provided by one or more advertisers.

15. A method comprising:

detecting, by a location-based dynamic hyperlinking computing system, a request made by a mobile access device to access a web page comprising a display element that is initially non-hyperlinked;

determining, by the location-based dynamic hyperlinking computing system, a geographic location of the mobile access device in response to the request;

selecting, by the location-based dynamic hyperlinking computing system, enhanced content to be associated with the display element in accordance with the geographic location;

dynamically hyperlinking, by the location-based dynamic hyperlinking computing system, the display element to the enhanced content;

determining, by the location-based dynamic hyperlinking computing system, an updated geographic location of the mobile access device in response to a movement of the mobile access device;

disassociating, by the location-based dynamic hyperlinking computing system, the enhanced content with the display element;

selecting, by the location-based dynamic hyperlinking computing system, other enhanced content to be associated with the display element in accordance with the updated geographic location; and dynamically hyperlinking, by the location-based dynamic hyperlinking computing system, the display element to the other enhanced content.

16. A method comprising:

detecting, by a location-based dynamic hyperlinking computing system, a request made by a mobile access device to access a web page comprising a display element that is statically included in the web page;

determining, by the location-based dynamic hyperlinking computing system, a geographic location of the mobile access device in response to the request;

scanning, by the location-based dynamic hyperlinking computing system in response to the determining of the geographic location of the mobile access device, the web page to identify the display element;

selecting, by the location-based dynamic hyperlinking computing system, enhanced content to be associated with the display element in accordance with the geographic location; and dynamically hyperlinking, by the location-based dynamic hyperlinking computing system, the display element to the enhanced content.

17. The method of claim 16, wherein the display element is initially non-hyperlinked prior to being dynamically hyperlinked to the enhanced content.

18. The method of claim 16, embodied as computer-executable instructions on at least one non-transitory computer-readable medium.

19. A method comprising:

detecting, by a location-based dynamic hyperlinking computing system, a request made by a mobile access device to access a web page;

determining, by the location-based dynamic hyperlinking computing system, a geographic location of the mobile access device in response to the request;

scanning, by the location-based dynamic hyperlinking computing system in response to the request, the web page to identify a display element included in the web page that matches a display element included in an enhanced content association table maintained by an enhanced content management server;

selecting, by the location-based dynamic hyperlinking computing system, enhanced content included in the enhanced content association table to be associated with the identified display element in accordance with the geographic location;

dynamically hyperlinking, by the location-based dynamic hyperlinking computing system, the identified display element included in the web page to the enhanced content; and directing, by the location-based dynamic hyperlinking computing system, the mobile access device to display the web page with the dynamically hyperlinked display element.

20. The method of claim 19, wherein the identified display element comprises a display element statically included in the web page.

21. The method of claim 19, wherein the identified display element is initially non-hyperlinked prior to being dynamically hyperlinked to the enhanced content.

22. The method of claim 19, wherein the scanning comprises scanning text included in the web page to identify a word in the web page that matches a word included in the enhanced content association table.

23. The method of claim 19, wherein the scanning comprises scanning one or more non-textual display elements included in the web page to identify a non-textual display element in the web page that matches a non-textual display element included in the enhanced content association table.

24. A system comprising:
  a dynamic hyperlink management facility configured to:
    detect a request made by a mobile access device to access a web page; and
    scan the web page to identify a display element that is initially non-hyperlinked; and
  a location tracking facility communicatively coupled to the dynamic hyperlink management facility and configured to determine a geographic location of the mobile access device in response to the request;
  wherein the dynamic hyperlink management facility is further configured to
    select enhanced content to be associated with the display element in accordance with the geographic location, and
    dynamically hyperlink the display element to the enhanced content.

25. The system of claim 24, further comprising a user interface facility selectively and communicatively coupled to the dynamic hyperlink management facility and configured to display the web page with the dynamically hyperlinked display element.

* * * * *